(12) United States Patent
De Pasquale et al.

(10) Patent No.: US 8,238,932 B2
(45) Date of Patent: Aug. 7, 2012

(54) DYNAMICALLY ALLOCATING CARRIERS

(75) Inventors: Andrea De Pasquale, Madrid (ES);
Kyriakos Exadaktylos, Madrid (ES);
Esperanza Alcazar Viguera, Madrid (ES); Clara Serrano Solsona, Madrid (ES); Javier López Roman, Madrid (ES); Aitor García Viñas, Madrid (ES); Santiago Tenorio Sanz, Madrid (ES); Yannick Le Pezennec, Madrid (ES)

(73) Assignee: Vodafone Group PLC, Newbury, Berkshire (GB)

( * ) Notice: Subject to any disclaimer, the term of this patent is extended or adjusted under 35 U.S.C. 154(b) by 115 days.

(21) Appl. No.: 12/886,984

(22) Filed: Sep. 21, 2010

(65) Prior Publication Data
US 2011/0077019 A1    Mar. 31, 2011

(30) Foreign Application Priority Data
Sep. 21, 2009 (ES) .................................. 200930708

(51) Int. Cl.
*H04W 88/02* (2009.01)
(52) U.S. Cl. ........................................ 455/453; 455/436
(58) Field of Classification Search .................. 455/453, 455/436–452.2
See application file for complete search history.

(56) References Cited

U.S. PATENT DOCUMENTS
6,907,243 B1    6/2005  Patel
2004/0100897 A1    5/2004  Shattil
2010/0061344 A1    3/2010  Goransson et al.
2010/0202431 A1    8/2010  Kazmi et al.
2011/0019564 A1*    1/2011  De Pasquale et al. ........ 370/252
2011/0085614 A1*    4/2011  De Pasquale et al. ........ 375/267

FOREIGN PATENT DOCUMENTS
GB    2 414 365    11/2005

OTHER PUBLICATIONS

European Search Report regarding EP 10 17 7683, Oct. 24, 2011.
Spanish Search Report regarding 200930708, Nov. 15, 2011.

* cited by examiner

*Primary Examiner* — Diane Mizrahi
(74) *Attorney, Agent, or Firm* — B. Aaron Schulman, Esq.; Terry L. Wright, Esq.; Stites & Harbison, PLLC

(57) ABSTRACT

To determine which traffic and terminal types and in which parts of a call should be best served by a given carrier there is provided a method and system for dynamically allocating carriers in a MIMO network using S-CPICH. The consideration of which carrier to allocate addresses problems caused by the enablement of the diversity transmission technique. Carriers are dynamically allocated to terminals in a WCDMA network scenario taking into account each terminal's vulnerability to interference from a carrier using S-CPICH or STTD according to certain parameters, such as a requested service or the radio conditions at any given time. The carriers are allocated from carriers using P-CPICH, S-CPICH and/or STTD. The invention also relates to a system that implements this method in a WCDMA network.

14 Claims, 8 Drawing Sheets

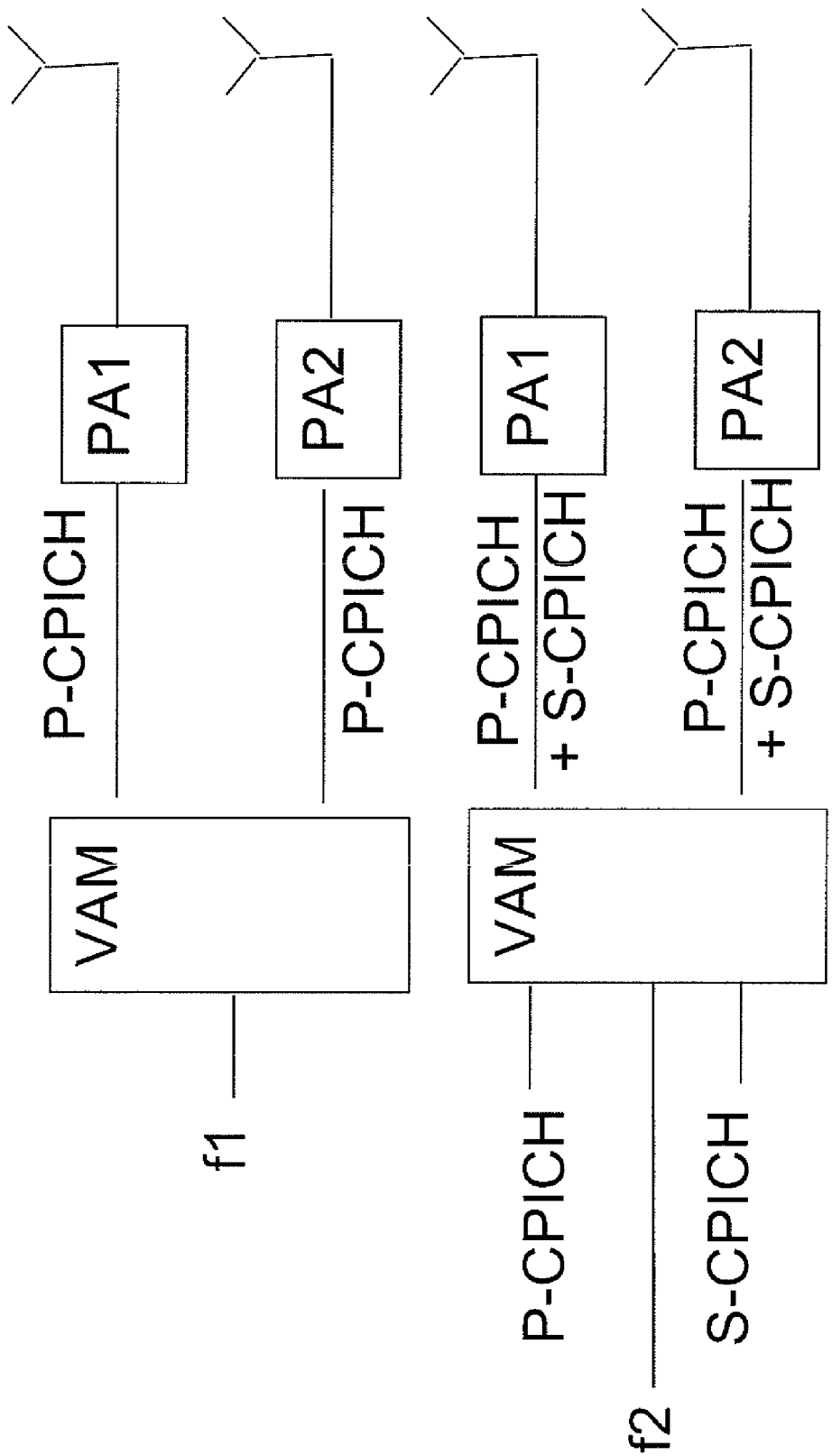
FIG. 1a (Conf. "A")

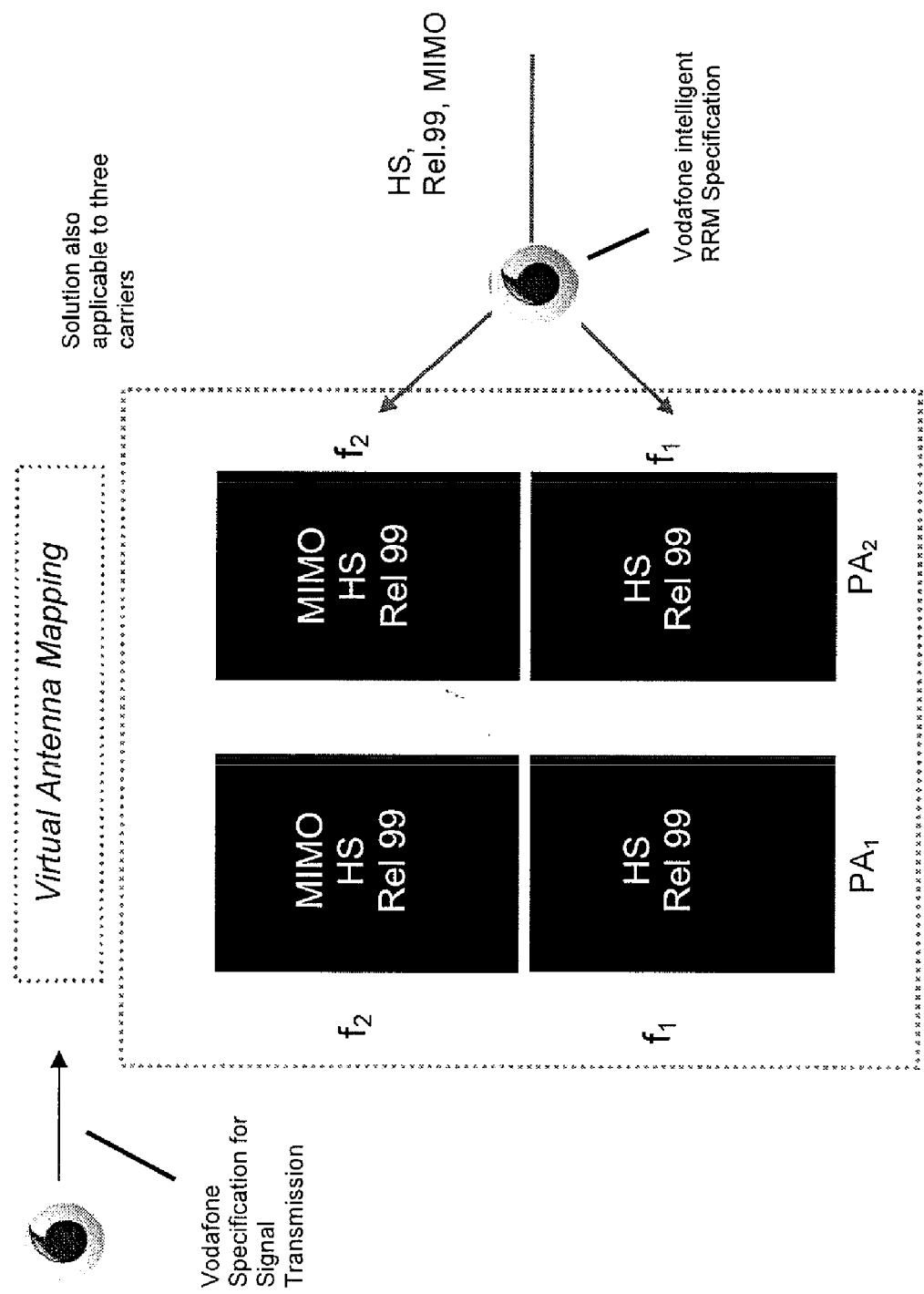
FIG. 1b (Conf. "A")

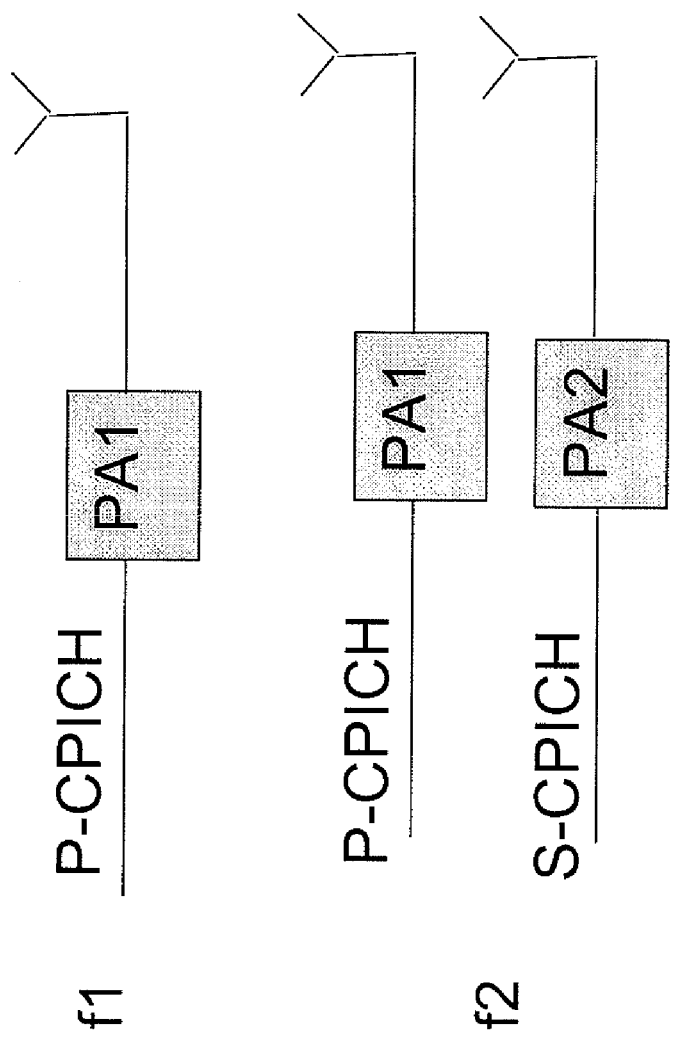
FIG. 2a (Conf. "B")

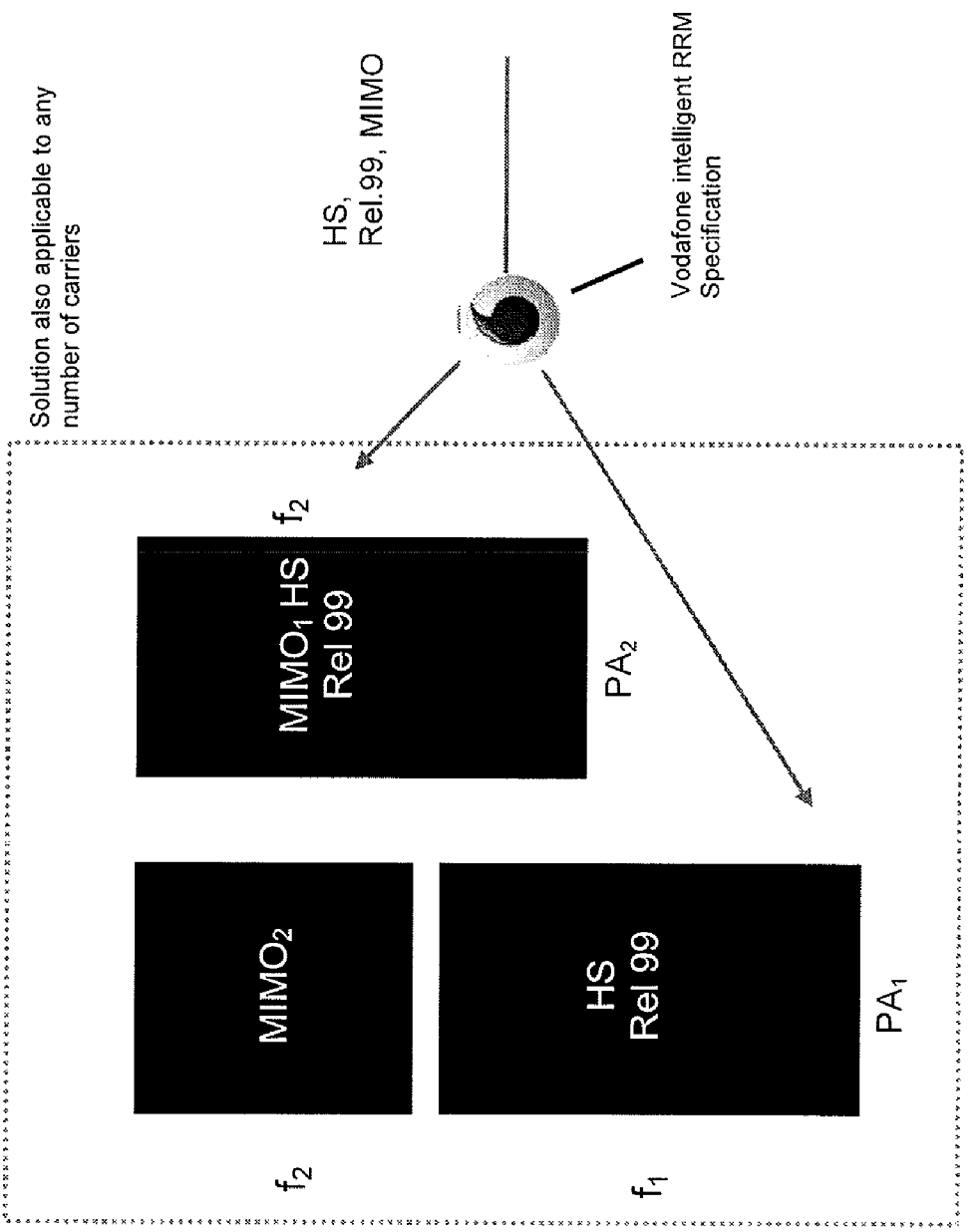
FIG. 2b (Conf. "A")

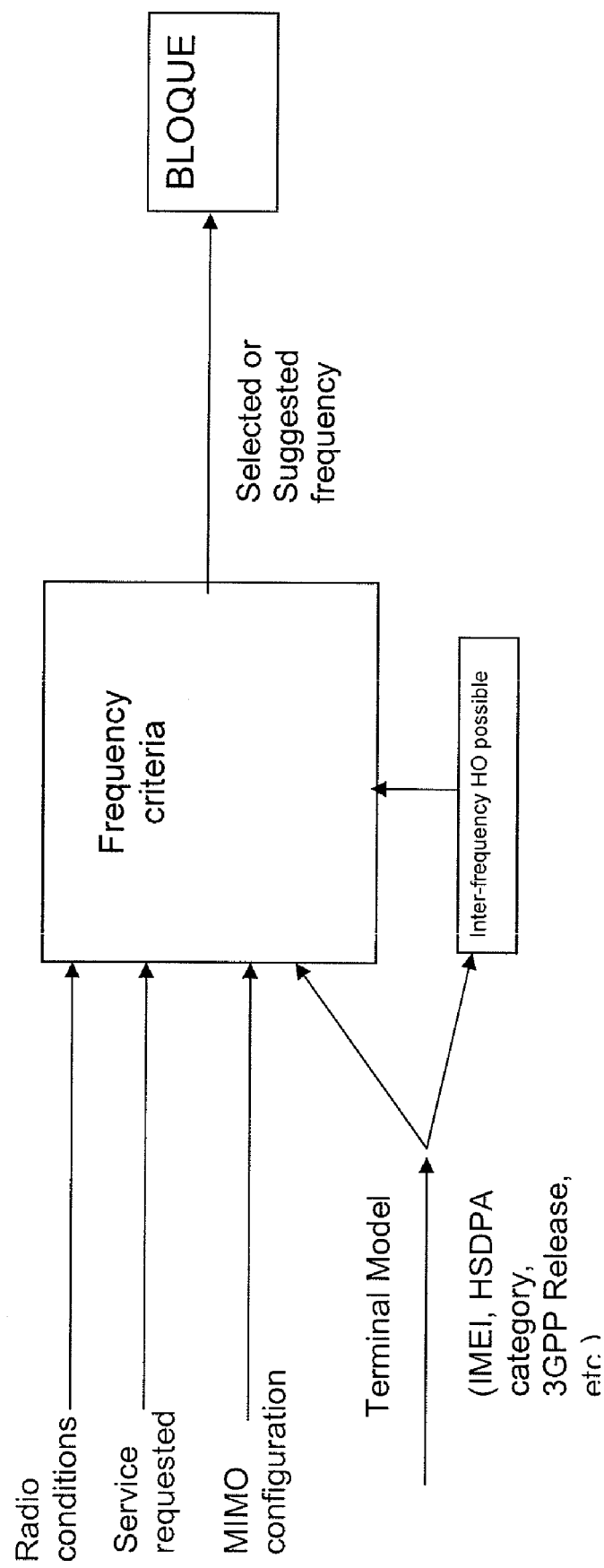

DYNAMICALLY ALLOCATING CARRIERS

FIELD OF THE INVENTION

The present invention is comprised within the field of mobile telecommunications. More specifically, it relates to a method and system of dynamically allocating carriers in a MIMO enabled mobile telecommunications network using diversity techniques and in particular UMTS systems supporting HDSPA protocol and MIMO techniques.

BACKGROUND OF THE INVENTION

HSDPA is a packet-based data service in the 3rd generation W-CDMA systems, which provides high-speed data transmission (up to 8-10 Mbps over a 5 MHz bandwidth in the Release 6 of 3GPP) in CDMA to support multimedia services. This system is evolved from and backward compatible with Release 99 (Rel'99) WCDMA systems, It is acknowledged that MIMO technology plays an important role in the evolution of HSDPA, mainly because it offers significant increases in downlink data rates (up to 28 Mbps at Physical layer). This is specified by the 3rd Generation Partnership Project (3GPP) and it is part of 3G mobile standard. In brief, MIMO technology is based on the usage of several antennas at both the transmitter and the receiver to improve communication performance and diversity techniques dividing information into two streams of bits to be transmitted and received by different antennas of Nodes B and UEs.

MIMO usually enables two parallel data flows at the same transmission (TX) power that are simultaneously transmitted in the downlink (DL). It thus requires two Power Amplifiers (PAs) transmitting in two independent channels and the availability of a diversity pilot. Therefore, each channel must have its own associated pilot to enable channel estimation and for an appropriate power control.

Once MIMO is activated in the system, an efficient usage of Radio resources requires that the PAs utilize the same amount of power even when non-MIMO traffic is present. For this reason MIMO introduction has always been associated and coupled with the activation of TX diversity techniques, namely TSTD and STTD and/or CLTD, to be applied and used for all the channels transmitted on a cell, i.e. to be used when transmitting data to existing Rel'99 and legacy HSDPA terminals. Such techniques guarantee the PAs to be balanced.

Among said diversity techniques, MIMO was particularly planned to be introduced with the use of STTD for seamless operation of all legacy services. STTD utilizes STBC (space-time block code) in order to exploit redundancy in multiply transmitted versions of a signal, that is, the two antennas transmit the same information but each one uses a different coding scheme. This is a mandatory requirement and therefore assumed to be supported by all terminals.

There are other possible approaches to grant power balancing. One way is the Virtual Antenna Mapping (VAM), which adaptively selects the number of antennas from which to transmit as well as selects the best subset of antennas for the selected transmission mode. VAM improves the balance of power from the two PAs in the low SNR (signal to noise ratio) region. This concept is specified in UTRA MIMO Extension 25.876, version 1.80.

Another way may be achieved by an inter-carrier load-balancing, a pseudo-balancing by ad-hoc traffic management. An additional carrier may be used (having available one carrier on the first PA and a second carrier on a second PA) paired with a load balancing between carriers.

MIMO transmits on 2 PAs, and therefore it needs pilot channels to enable the UE to do the channel estimation. In case of STTD, the Primary CPICH and the Diversity Primary CPICH are transmitted by each PA respectively. MIMO with Virtual Antenna Mapping does not require Diversity Primary CPICH but uses the S-CPICH (Secondary Common Pilot Channel) for the UE to do the channel estimation in the second transmission. This concept is described in 3GPP Rel'7 standard for MIMO implementation in WCDMA.

Summarizing, MIMO transmission needs the usage of two PAs and the availability of a 2 different pilots (one per each PA), which can be provided by the usage of either a Diversity CPICH (mostly with STTD transmission mode) or an S-CPICH (with Virtual Antenna mapping).

The above features need support in MIMO-enabled terminals and in the network as well. On the other hand, it is also important that MIMO terminals coexist with other terminals like Rel'99 and HSDPA terminals. Consequently, backward-compatibility is required.

Unexpectedly, the first trial measurements carried in field have shown an incompatibility of certain terminals. The problem occurs in connection with STTD activation, which significantly decreases, in both good and medium radio conditions, the performance of some categories of HSDPA terminals already in the market. Depending on the device and radio conditions, STTD was found to degrade data performance for legacy HSPA data devices up to 40%.

In particular, it was observed that nearly all legacy HSPA terminals with type 2/3 Receiver disable the equalizer when STTD is enabled. Seemingly this is a compromise in the design phase to save processing power. This problem remained unknown to date as STTD has never been used before.

The 3GPP classifies HSDPA mobile terminals into different categories according to their data transmission capability. This is illustrated in a table.

| HS-DSCH category | Maximum number of HS-DSCH codes received | Minimum inter-TTI interval | Maximum number of bits of an HS-DSCH transport block received within an HS-DSCH TTI NOTE 1 | Total number of soft channel bits | Supported modulations without MIMO operation | Supported modulations simultaneous with MIMO operation | Throughput |
|---|---|---|---|---|---|---|---|
| Category 1 | 5 | 3 | 7298 | 19200 | QPSK, 16QAM | Not applicable | 3.649 |
| Category 2 | 5 | 3 | 7298 | 28800 | | (MIMO not | 3.649 |
| Category 3 | 5 | 2 | 7298 | 28800 | | supported) | 3.649 |
| Category 4 | 5 | 2 | 7298 | 38400 | | | 3.649 |
| Category 5 | 5 | 1 | 7298 | 57600 | | | 3.649 |

| HS-DSCH category | Maximum number of HS-DSCH codes received | Minimum inter-TTI interval | Maximum number of bits of an HS-DSCH transport block received within an HS-DSCH TTI NOTE 1 | Total number of soft channel bits | Supported modulations without MIMO operation | Supported modulations simultaneous with MIMO operation | Throughput | |
|---|---|---|---|---|---|---|---|---|
| Category 6 | 5 | 1 | 7298 | 67200 | | | 3.649 | |
| Category 7 | 10 | 1 | 14411 | 115200 | | | 7.2055 | |
| Category 8 | 10 | 1 | 14411 | 134400 | | | 7.2055 | |
| Category 9 | 15 | 1 | 20251 | 172800 | | | 10.1255 | |
| Category 10 | 15 | 1 | 27952 | 172800 | | | 13.976 | |
| Category 11 | 5 | 2 | 3630 | 14400 | QPSK | | 1.815 | |
| Category 12 | 5 | 1 | 3630 | 28800 | | | 1.815 | |
| Category 13 | 15 | 1 | 35280 | 259200 | QPSK, 16QAM, | | 17.64 | |
| Category 14 | 15 | 1 | 42192 | 259200 | 64QAM | | 21.096 | MIMO |
| Category 15 | 15 | 1 | 23370 | 345600 | | QPSK, 16QAM | 11.685 | 23.37 |
| Category 16 | 15 | 1 | 27952 | 345600 | | | 13.976 | 27.952 |
| Category 17 NOTE 2 | 15 | 1 | 35280 | 259200 | QPSK, 16QAM, 64QAM | — | 17.64 | |
| | | | 23370 | 345600 | — | QPSK, 16QAM | 11.685 | 23.37 |
| Category 18 NOTE 3 | 15 | 1 | 42192 | 259200 | QPSK, 16QAM, 64QAM | — | 21.096 | |
| | | | 27952 | 345600 | — | QPSK, 16QAM | 13.976 | 27.952 |

The problem is linked to the fact that Cat'7 and 8 UEs use a Type 2 (single Rx antenna and equalizer) or Type 3 (dual Rx antenna and equalizer) receiver in order to boost the DL peak rate in good radio conditions, but the utilization of STTD provokes that these Type 2 or Type 3 Receivers in the UE to perform as Type 0 or 1 (i.e. RAKE receiver or dual Rx antenna without equalizer), with an associated lower peak rate performance.

As mentioned before, due to the impact of STTD can be significant, as alternative the usage of a secondary CPICH (S-CPICH) instead of using STTD. is possible in order to provide diversity to MIMO. In this regard, MIMO transmission over S-CPICH has the advantageous effect not to switch off the UE equalizer, but, at the same time, is problematical because it provokes a new non-orthogonal interference in the system. This interference may be tolerable or not depending on certain circumstances. Later, this important issue is discussed in more detail.

Owing to the fact that the performance characterizations are ongoing and may be different per each terminal, it is thus desirable the system to be adaptable. Therefore, a solution of this problem needs to deal with determination of which traffic and terminal types and in which moment of a call have to go to the carrier in which the S-CPICH is used. Also, it should support safe inter-frequency handovers (IF HO).

GLOSSARY

It is well-known that abbreviations and acronyms are frequently used in the mobile telephony field. Below there is a list of acronyms/terms used throughout the present specification:

| | |
|---|---|
| 3GPP | The 3rd Generation Partnership Project |
| CDMA | Code Division Multiple Access |
| CQI | Channel Quality Indicator |
| CPICH | Common Pilot Channel |
| CLTD | Closed Loop Transmit Diversity |
| DL | Downlink |
| Ec/N0 | Carrier signal power-to-noise Ratio |
| HO | Handover |
| HSDPA | High Speed Downlink Packet Access |
| IE | Information Element |
| MIMO | Multiple Input - Multiple Output |
| PA | Power Amplifier |
| P- CPICH | Primary CPICH |
| RRC | Radio Resource Control |
| RRM | Radio Resource Management |
| RSCP | Received Signal Code Power |
| S- CPICH | Secondary CPICH |
| STTD | Space Time Transmit Diversity |
| TSTD | Time Switched Transmit Diversity |
| UE | User Equipment |
| UMTS | Universal Mobile Telecommunications System |
| UTRAN | UMTS Terrestrial Radio Access Network |
| VAM | Virtual Antenna Mapping |
| TTI | Time Transmission Interval |

BRIEF DESCRIPTION OF THE DRAWINGS

The above and other objects and features of the invention will appear clearer with the following accompanying drawings, given as non-restrictive examples.

FIG. 1a and 1b show configuration "A" scheme. No STTD, S-CPICH and VAM.

FIGS. 2a and 2b show configuration "B" scheme. No STTD, S-CPICH and no-VAM.

FIG. 3 Function according to an implementation of the proposed method.

SUMMARY OF THE INVENTION

Figure 4:
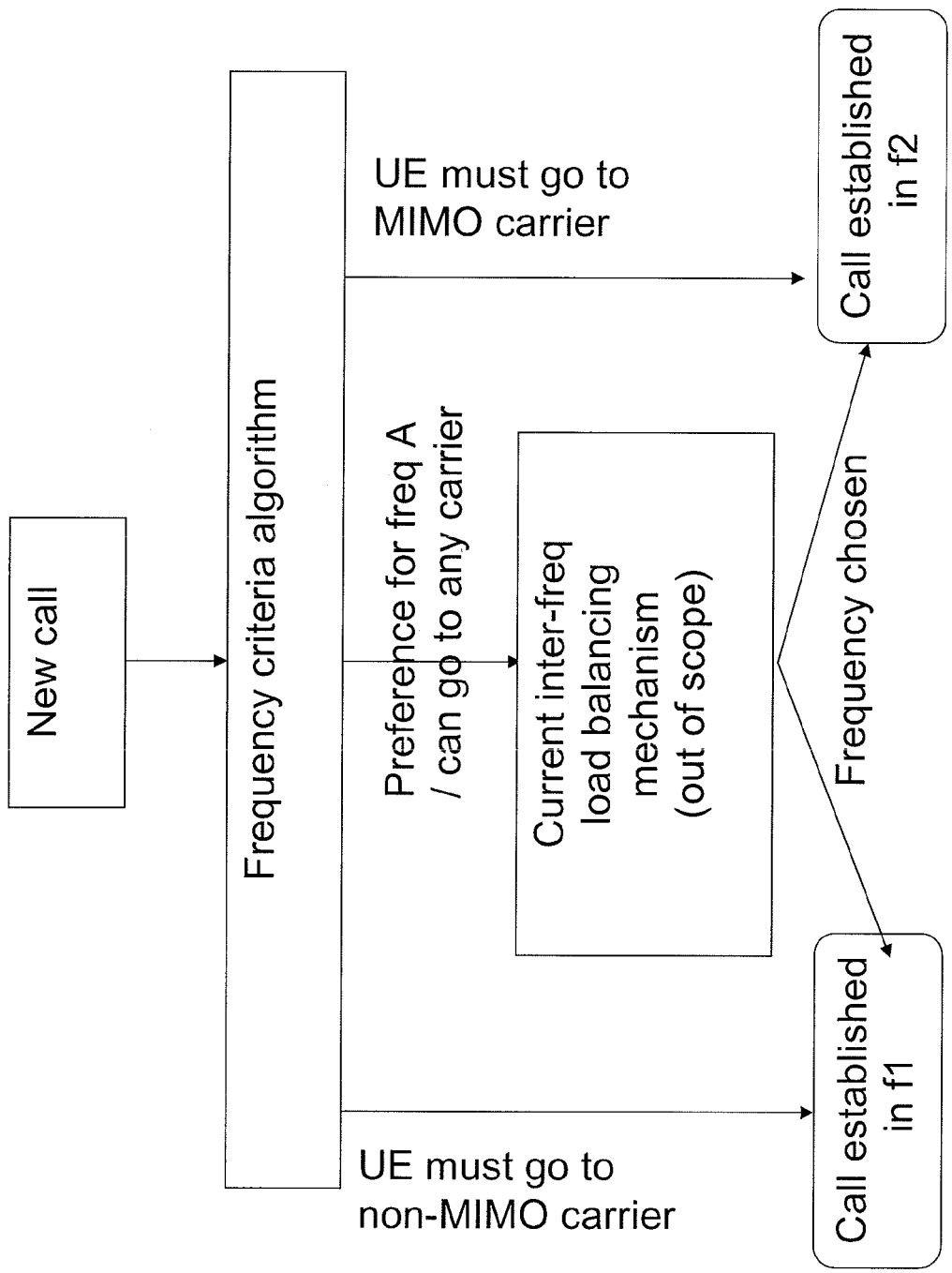
FIG. 4 Flow chart
Figure 5:
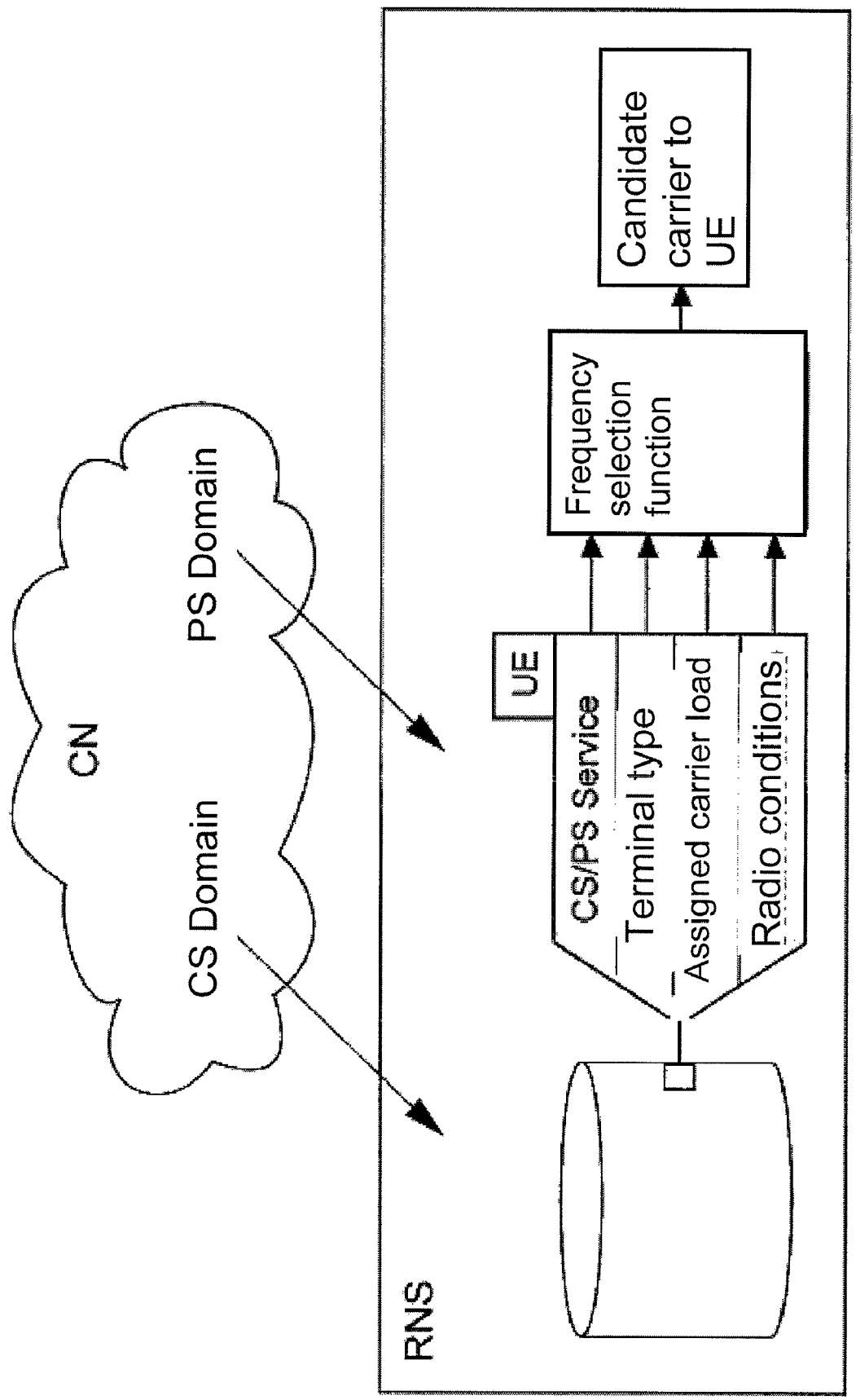
FIG. 5 is a functional block diagram showing an embodiment in accordance with the present invention.
Figure 6:
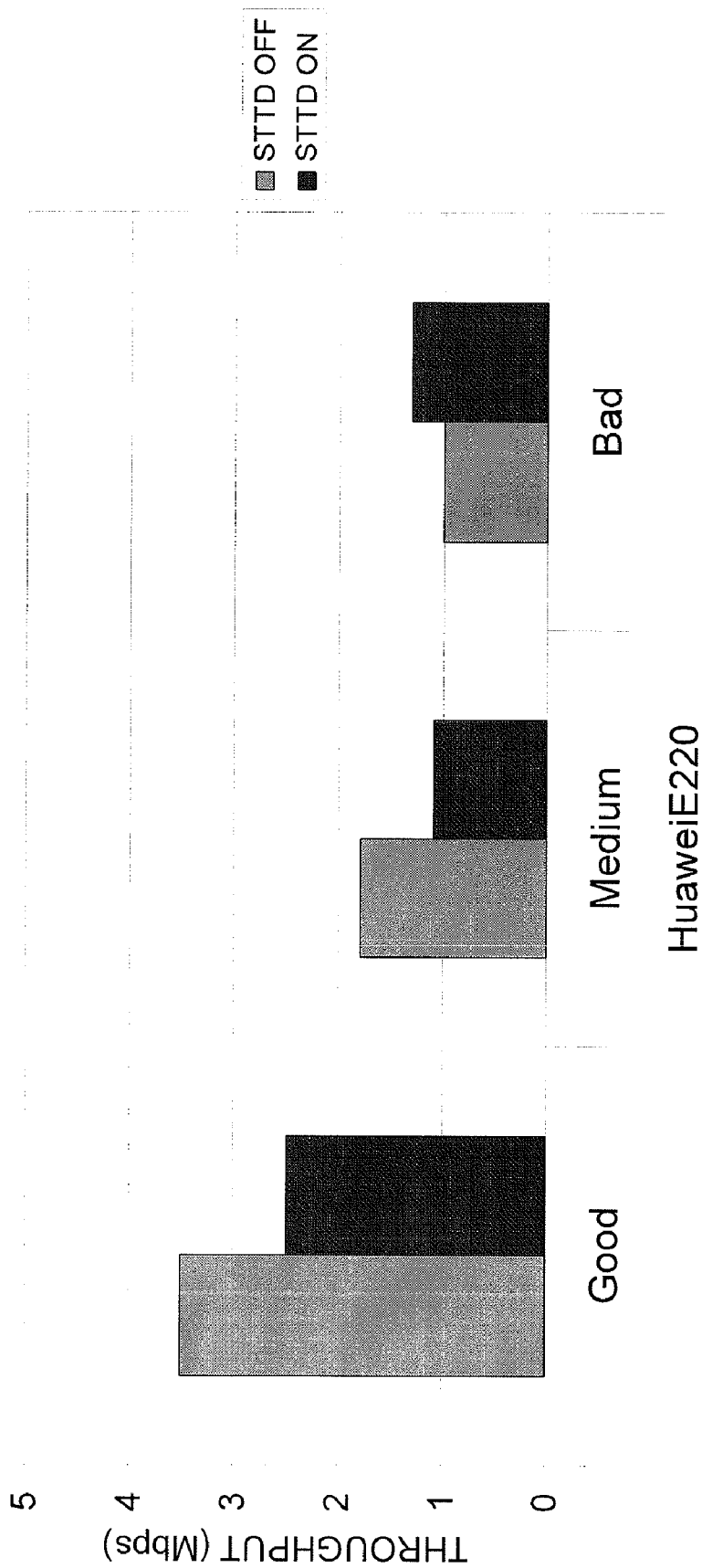
FIG. 6 shows a diagram of STTD impact.

In view of the described situation, the present invention proposes a novel policy that overcomes the problems pointed out before and protects HSDPA performances for MIMO configurations using S-CPICH by distributing traffic according to certain conditions, principally network characteristics and terminal features.

As mentioned before, MIMO transmission needs the usage of two PAs transmitting in two independent channels and the availability of a diversity pilot (one per each PA). This can be provided by the usage of:
STTD technique (Diversity CPICH) or
S-CPICH (Secondary CPICH).

MIMO transmission also implies the need to balance the transmission power from the two PAs in order to maintain performance and improve efficiency. This can be done via:
STTD as diversity technique.
Usage of a Virtual Antenna Mapping, which is transparent to the legacy UEs.
Limited inter-carrier load balancing. Balancing PAs using different carriers over them, this is a pseudo balancing by ad-hoc traffic management, as it is not possible to use exactly the same amount of power in 2 frequencies with different users. The basics for this is to check the Power used in every PA and allocate more users to the emptier PA.

In the next paragraphs, a solution to the problem of interference caused by S-CPICH in UEs is put forward considering that STTD is not used as a method of diversity in the network. This solution includes an allocation policy, which efficiently handles traffic load of UEs on the carriers estimating whether a given UE is a suitable candidate for being allocated to a S-CPICH carrier.

Under said circumstances, two different scenarios are discussed below, wherein the proposed solution by present invention is suitable. For simplicity, the cases consider two carriers. Yet the solution is also valid for more than two carriers.

"A" Configuration Scheme: Secondary Pilot with VAM (Carrier f1 and f2 in PA1 & PA2)

Considering a network scenario with just two carriers (noted as f1 and f2), assuming that MIMO is active in carrier f2, having P-CPICH on transmission branch 1 and S-CPICH on transmission branch 2; further assuming that non-MIMO users can be in carrier f1 or f2 and P-CPICH is only used for them, but MIMO is not used in the carrier f1.

Then, the balance transmission power policy uses a VAM function to distribute traffic allocated to f1 and f2 in both PA1 and PA2. Therefore both P-CPICH and S-CPICH are transmitted in both PAs but with different phases introduced by the VAM function. This VAM function for balancing f1 and f2 transmission in both PA1 and PA2 is not an object of the present invention.

"B" Configuration Scheme: Secondary Pilot without VAM (Carrier f1 in PA1)

In a network scenario with just two carriers (f1, f2), assuming that MIMO is only active in carrier f2, having P-CPICH on PA2 and S-CPICH on PA1; further assuming that carrier f1 only uses PA1 and non-MIMO users can be setup in carrier f1 or f2 and so P-CPICH is only used for them.

To do an efficient use of the power amplifier 1, it is necessary the dynamic power allocation. In PA1 it is configured:
In carrier with frequency 2: the S-CPICH and the second branch of MIMO transmission,
In carrier with frequency 1: all the active channels (common channels, R99, HSPA).

Then, in order to use the power when one of the frequencies is not using it, it is needed to dynamically allocate it.

Transmission power of the two PAs is balanced by an intelligent RRM functionality (not part of this invention), although this power balancing is limited to Inter-carrier load balancing. The RRM is checking the amount of power used in every PA and then decisions are taken in order to put users in f1 carrier or f2 carrier depending on this power used.

The proposed solution defines a flexible traffic allocation policy, applicable to both scenarios, "A" and "B" configurations, wherein UEs are distributed according to their capabilities. The solution aims to expose the non-MIMO terminals to interference derived from S-CPICH and from MIMO transmission only when their performances are not significantly impacted. Therefore a criterion is needed in order to define and estimate these levels and minimize this non-equalized interference. Basically, as S-CPICH is consuming some power, the categories 7 to 10 which are in good radio conditions which, therefore are capable to get the maximum bit rate possible, will be put into frequency 1 for saving power as SPICH requires some additional power. Yet the frequency 2 is also valid.

Firstly, it is identified that the impact of the interference may be different based on four main factors:
The Radio conditions experienced by a specific UE on a specific moment in time. They are evaluated as a function of the CQI, Ec/N0 and RSCP and classified as Good, Medium or Bad.
The possibility for the network to multiplex in Code (same TTI), MIMO transmission with non-MIMO transmission (network parameter).
The network Configuration used (Configuration A, Configuration B or any other Configuration using MIMO in which at least 2 carriers are used).
The model of terminal (e.g. max peak rate, active RX diversity etc.)

A particular object of this invention is to provide a special function for defining a traffic allocation policy. This function is implemented in the RNC, which obtains as an input data from NodesB at call set-up and periodically during the call gets:
Dynamic parameter: Radio conditions experienced by a specific UE.
Service requested (CS or PS).
Fixed parameters: MIMO Network configuration.
Fixed Parameters: Features of terminal.
Although the model is not currently available in the RNC, it is possible to identify sets or families of UEs to be matched with operator statistical information on the UE population available on the network.
The terminals can be thus classified on the basis of having common features, using Information Elements (IE) that are or could be made available at the RNC level, among them, they are the following: IMEI; Service Requested; HSDPA capable; HSDPA Category; 3GPP Release; With external power supplies or not (i.e. datacard or normal handset).
The function indicates how to allocate new UEs (also existing UEs) to carriers.

Preferred Embodiment

A preferred embodiment for carrying out the present invention will now be described with reference to the accompanying drawings to explain the invention in more detail.

In a network scenario with two carriers, f1, f2, being f1 a carrier free of MIMO traffic and f2 a carrier using S-CPICH for diversity provision to MIMO traffic, FIG. 4 shows a flow diagram of the steps followed when a UE arrives to the RNC with a call set-up (1). The RNC checks whether the UE is vulnerable to interference derived from S-CPICH and MIMO transmission. To this end, several parameters are checked; some of them are periodically revised since conditions may change. An example of these parameters is shown in a table below.

| Service Request | UE MIMO | UE HSPA category | UE 3GPP release | Radio Conditions | Datacard or handset |
|---|---|---|---|---|---|
| CS | Yes | NA | NA | NA | Handset |
| PS | No | 12 | 5 | Good | Datacard |
| PS | No | 8 | 6 | Good | Datacard |
| PS | Yes | 16 | 8 | Good | Datacard |
| ... | | | | | |

According to the information available in the table, which may be stored in a database for being used, the proposed function of the present invention provides with an output. This output is a number, which indicates the RNC which carrier to use for a particular UE. The number also establishes a priority on the basis of:

UE can go to any carrier, then function value=0;
UE should preferably go to a non-MIMO carrier, then function value=1;
UE should preferably go to a MIMO carrier, then function value=2;
UE must go to a non-MIMO carrier, then function value=3;
UE must go to a MIMO carrier, then function value=4;

For instance, if the service requested is CS, and the UE is a handset MIMO terminal, then the function output is "3", which means that the UE must go to a non-MIMO carrier and this result is valid regardless the radio condition. Therefore, for this particular UE is not necessary to take into account radio condition measuring and this measure can be avoided.

Another example, if the service requested is PS and the UE is a Datacard non-MIMO terminal with cat. 12 and rel.5, then the function output is "3" provided that radio condition are good.

It is clear that the function may be much more complicated by defining further criterion and assigning different weights according to the UE vulnerability and probabilities of being affected by future radio conditions. Similarly, radio conditions are defined as good/medium/bad in these examples but additional thresholds may be established. In this regard, also fuzzy logic may be applied for these variables and parameters.

In addition, at call set-up the support of Inter-frequency HO (handover) by the UE is also evaluated based on the available information of the Model of the terminal, and it is fed into any available Frequency Selection system in order to know if an inter-frequency HO is supported/possible and if a terminal can actually be moved from a carrier to another during the call in case the Radio Conditions change.

The function for defining a traffic allocation policy may be also represented as a table, matching inputs into desired outputs. This table may include among others the following data:

This information is gathered from different sources. The UE sends most of this information to the RNC directly (Service Request, UE HSPA category, UE MIMO or not, UE 3GPP release, Data card or handset) and for example the radio conditions are evaluated in the Nodes B.

The inputs of the above table may be stored in a database to be available for a system implementing the function. Thus, this database keeps information regarding the particularities of a given UE as well as the condition of the network in a particular moment. This database needs to be periodically updated and fed with new data in order to be used by the system.

Furthermore, not all the UE in a network support MIMO. This can be detected in first RRC connection request message with the Release information.

Since the RNC is aware of UE capabilities, radio conditions experienced UEs and the network configuration regarding MIMO and the load of traffic from the existing UEs on the carriers, it is thus possible to make a decision on assigning a carrier to this UE, even during a established call or a service (in the event that the UE supports inter-frequency handover).

On the whole, this approach permits an advantageous traffic allocation and power balancing between PAs, activating MIMO with S-CPICH and maintaining the performances of other UEs supports.

The invention claimed is:

1. A method for dynamically allocating carriers to a mobile terminal in a cellular telecommunication network with at least one of the carriers using Multiple Input/Multiple Output (MIMO) with a diversity transmission technique comprising the steps of:

evaluating radio network conditions of the mobile terminal;
providing a measure of the load of the carriers in the Wideband Code Division Multiple Access (WCDMA) network;
obtaining information of type of the mobile terminal;
identifying whether service requested by the mobile terminal is Packet switched (PS) service;
allocating one mobile terminal to the carrier using MIMO with diversity in dependence upon the radio condition, load and terminal characteristics, whereby problems caused by enablement of the diversity transmission technique are substantially mitigated.

2. The method according to claim 1, wherein the diversity transmission technique used is Secondary Common Pilot Channel (S-CPICH), and the criterion considers the vulnerability of the mobile terminal to interference provoked by S-CPICH.

| Service Request | UE MIMO | UE HSPA category | UE 3GPP release | Radio Conditions | Datacard or handset | RX diversity | Output |
|---|---|---|---|---|---|---|---|
| CS | NA | NA | NA | NA | Handset | No | UE must go to a non-MIMO carrier |
| PS | No | 12 | 5 | Good | Datacard | No | Preference to MIMO carrier |
| PS | No | 8 | 6 | Good | Datacard | No | Must go to non-MIMO carrier |
| PS | No | 8 | 6 | Good | Datacard | Yes | Must go to MIMO carrier |
| PS | Yes | 16 | 8 | Good | Datacard | Yes | Must go to MIMO carrier |
| PS | No | 1-6 | 6 | Medium | Handset | No | Preference to MIMO carrier |

3. The method according to claim 1, wherein the diversity transmission technique used is Space Time Transmit Diversity (STTD) and the criterion considers the performance degradation of the mobile terminal associated with STTD.

4. The method according to claim 1, wherein the information of type of mobile terminal includes inter-frequency HO (handover) capability in order to allow the mobile terminal to be allocated to a different carrier during a call.

5. The method according to claim 1, wherein the network conditions are evaluated by means of at least one of the following parameters:
   Channel Quality Indicator (CQI);
   Carrier signal power-to-noise Ratio (Ec/N0);
   Received Signal Code Power (RSCP);
   and combinations thereof.

6. The method according to claim 1, wherein the network conditions are evaluated at call set-up and periodically during the call.

7. The method according claim 1, wherein the information of type of mobile terminal includes at least one of the following parameters: International Mobile Equipment Identity (IMEI), Service Requested, High Speed Downlink Packet Access (HSDPA) capable, High Speed Packet Access (HSPA) category, 3rd Generation Partnership Project (3GPP) release and external power supplies.

8. The method according to claim 1, wherein a function is implemented for evaluating mobile terminal vulnerability by matching information obtained as inputs from previous steps with a table having a predefined output for each possible combination of inputs.

9. The method according to claim 1, wherein the load of Power Amplifiers (PAs) is balanced by means of a Virtual Antenna Mapping (VAM) function in order to distribute power across carriers.

10. The method according to claim 1, wherein the load of Power Amplifiers (PAs) is balanced by a Radio Resource Management (RRM) intelligent function.

11. A system for dynamically allocating carriers to mobile terminals in a cellular telecommunication network with at least one carrier using MIMO with a diversity technique, the system comprising:

a Radio Network Controller (RNC) that controls evaluation of radio network conditions for the mobile terminals, identifies services requested by the mobile terminals and measures a load of the at least one carrier;

an interface unit that obtains information of types of the mobile terminals; and a database that receives as inputs and stores information regarding the evaluation of the radio network conditions by the mobile terminals, the services requested by the mobile terminals, the measured load of the at least one carrier, and the information of the types of the mobile terminals; and wherein the RNC is implemented to select a candidate carrier for a mobile terminal by matching the information stored in said database for the mobile terminal and the measured load of the at least one carrier with a pre-established criteria.

12. The system according to claim 11, wherein the diversity technique used is S-CPICH, and wherein the information of the types of the mobile terminals obtained by the interface unit includes information regarding a vulnerability of the mobile terminals to interference provoked by the S-CPICH.

13. The system according to claim 11, wherein the diversity technique used is STTD, and wherein the information of the types of the mobile terminals obtained by the interface unit includes information regarding performance degradation of the mobile terminals associated with use of STTD.

14. The system according to claim 11, wherein the criteria is stored in an entry of the database that is accessed by the RNC to select the candidate carrier, the entry having a set of fields comprising;
   Service Request;
   User Equipment (UE) MIMO support;
   User Equipment (UE) HSPA category;
   User Equipment (UE) 3GPP release;
   Radio Conditions; and
   Datacard or handset.

* * * * *